(12) United States Patent
Bernsen

(10) Patent No.: US 11,743,731 B2
(45) Date of Patent: Aug. 29, 2023

(54) METHOD AND DEVICE TO ESTABLISH A WIRELESS SECURE LINK WHILE MAINTAINING PRIVACY AGAINST TRACKING

(71) Applicant: KONINKLIJKE PHILIPS N.V., Eindhoven (NL)

(72) Inventor: Johannes Arnoldus Cornelis Bernsen, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 53 days.

(21) Appl. No.: 17/271,621

(22) PCT Filed: Aug. 23, 2019

(86) PCT No.: PCT/EP2019/072649
§ 371 (c)(1),
(2) Date: Feb. 26, 2021

(87) PCT Pub. No.: WO2020/043634
PCT Pub. Date: Mar. 5, 2020

(65) Prior Publication Data
US 2021/0329462 A1 Oct. 21, 2021

(30) Foreign Application Priority Data
Aug. 27, 2018 (EP) ..................... 18190900

(51) Int. Cl.
*H04W 12/50* (2021.01)
*H04L 9/08* (2006.01)
(Continued)

(52) U.S. Cl.
CPC ............. *H04W 12/50* (2021.01); *H04L 9/088* (2013.01); *H04L 9/30* (2013.01)

(58) Field of Classification Search
CPC ..... H04W 12/50; H04W 12/02; H04W 84/12; H04L 9/088; H04L 9/30
See application file for complete search history.

(56) References Cited

U.S. PATENT DOCUMENTS 6,178,506 B1 * 1/2001 Quick, Jr. ............. H04W 12/35
713/168
10,169,587 B1 * 1/2019 Nix ....................... H04W 12/041
(Continued)

FOREIGN PATENT DOCUMENTS

WO 20170207017 A1 12/2017

OTHER PUBLICATIONS

T. Clancy et al "Extensible Authentication Protocol (EAP) Password Authenticated Exchange" Nov. 2006.
(Continued)

*Primary Examiner* — Fatoumata Traore
*Assistant Examiner* — Hamid Talaminaei

(57) ABSTRACT

This application relates to devices and a method to establish a secure wireless link for communication between a first and a second device over a wireless physical channel, wherein a paring protocol requires sending over the wireless channel identifying information by the first device, identifying information being data suitable for identifying the device sending the identifying information or a user thereof wherein the first device encrypts and transmits the identifying information by using a public key information of the second device and random information, the second device receives the encrypted identifying information and using private key information associated with the public key information it extracts the identifying information. The devices use a secret uniquely related to the identifying information to derive a session key and then use the session key to establish the secure wireless link. For example, the wireless channel is Wi-Fi, the identifying information is an identifier for a
(Continued)

password or passphrase and the secret is the password or passphrase and the authentication method is simultaneous authentication of equals (SAE). Alternatively the pairing protocol is DPP and the identifying information is a part of the DPP Connector. The public key information can be transmitted in a Beacon, DMG Beacon, Probe Response, Announce, or Information Response frame or be configured in the first device by a DPP Configurator using the DPP protocol adapted for transferring the public key information as part of the DPP Configuration response message.

17 Claims, 1 Drawing Sheet

(51) Int. Cl.
*H04L 9/30* (2006.01)
*H04W 84/12* (2009.01)
*H04W 12/02* (2009.01)

(56) References Cited

U.S. PATENT DOCUMENTS

| | | | |
|---|---|---|---|
| 2015/0024787 | A1 | 1/2015 | Ben-Ithak et al. |
| 2015/0373692 | A1 | 12/2015 | Jern et al. |
| 2018/0077255 | A1* | 3/2018 | Goto .................. H04L 67/289 |
| 2018/0109381 | A1* | 4/2018 | Cammarota .......... H04L 9/0819 |
| 2020/0154276 | A1* | 5/2020 | Minakawa ............... H04L 9/32 |
| 2020/0322794 | A1* | 10/2020 | Baltatu ................. H04W 12/04 |

OTHER PUBLICATIONS

International Search report and Written Opinion from PCT/EP2019/072649 dated Oct. 24, 2019.
WiFi Alliance "Device Provisioning Protocol Specification Version 1.0" Apr. 9, 2018.
IEEE Computer Society, "IEEE Standard for Information Technology—Telecommunications and Information Exchange Between Systems—Local and Metropolitan Area Networks—Specific requirements Part 11: Wireless LAN Medium Access Control (MAC) and Physical Layer (PHY) Specifications," (IEEE Std. 802.11-2016), Dec. 2016.
Diffie, W.; Hellman, M. (1976), "New directions in cryptography", IEEE Transactions on Information Theory, 22 (6): 644-654.
Device Provisioning Protocol—Technical Specification—Version 1.0, Wi-Fi Alliance, 2018.
Koblitz, N. (1987). "Elliptic curve cryptosystems". Mathematics of Computation. 48 (177): 203-209.
"The EAP-TLS Authentication Protocol", Mar. 2008, https://datatracker.ietf.org/doc/rfc5216/.
Internet X.509 Public Key Infrastructure Certificate and Certificate Revocation List (CRL) Profile, May 2008, https://datatracker.ietf.org/doc/rfc5280/.
JSON Web Key (JWK), May 2015, https://datatracker.ietf.org/doc/rfc7517/.
PKCS #1: RSA Cryptography Specifications Version 2.2, Nov. 2016, https://datatracker.ietf.org/doc/rfc8017/.
Rivest, R.; Shamir, A.; Adleman, L. (Feb. 1978). "A Method for Obtaining Digital Signatures and Public-Key Cryptosystems", Communications of the ACM. 21 (2): 120-126.
Aritro Sengupta and Utpal Kumar Ray, "Message mapping and reverse mapping in elliptic curve cryptosystem", Security Comm. Networks 2016; 9:5363-5375, Published online Nov. 22, 2016 in Wiley Online Library (wileyonlinelibrary.com). DOI: 10.1002/sec.1702.
WPA2™—Enterprise Provides Security-Protected Authentication and Enables Product Use in Multiple Markets, Wi-Fi Alliance Security Marketing TG, Apr. 30, 2008, https://groups.wi-fi.org/apps/org/workgroup/gmdocs/download.php/10413/20080430%20WPA2-Enterprise%20Technical%20Note%20for%20WFA%20Members.pdf.
Wi-Fi Protected Access (WPA), Enhanced Security Implementation Based on IEEE P802.11i standard, Version 3.1, Aug. 2004, Wi-Fi Alliance.
WPA3™ Specification, Version 1.0, Apr. 2018, Wi-Fi Alliance.

* cited by examiner

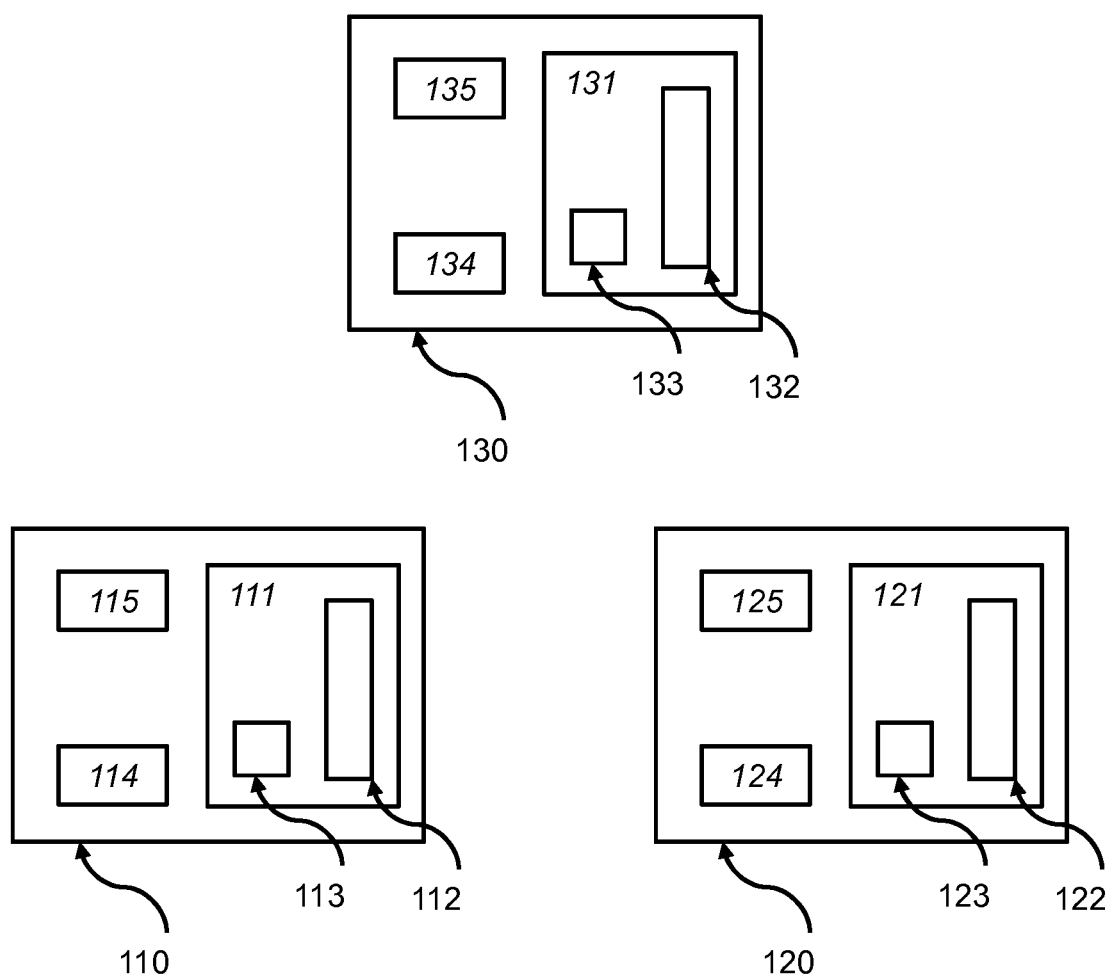

METHOD AND DEVICE TO ESTABLISH A WIRELESS SECURE LINK WHILE MAINTAINING PRIVACY AGAINST TRACKING

CROSS REFERENCE TO RELATED APPLICATIONS

This application is a U.S. national phase application of International Application No. PCT/EP2019/072649 filed on Aug. 23, 2019, which claims the benefit of EP Application Serial No. 18190900.3 filed on Aug. 27, 2018.

FIELD OF THE INVENTION

The invention relates to a method and device to establish a wireless secure link over a wireless physical channel.

The present invention relates to the field of security of wireless data communication, and more in particular provides devices and methods for establish a wireless secure link over a wireless physical channel.

BACKGROUND OF THE INVENTION

In view of the increase in the number of connected devices there a growth in the interest in privacy and protection against tracking by third parties.

MAC addresses are device addresses that are used in the link layer of the Open Systems Interconnection model (OSI). In particular, when a wired or wireless device transmit a message over a link, they use a MAC address to identify themselves as the sender. Although MAC addresses have a clear technical purpose in the OSI model, namely to identify a certain device, this can lead to a privacy problem as, in most cases, a device uses a constant MAC address to identify itself since a fixed MAC address is given to every device during manufacture.

A third party can use a receiver to receive link layer messages, collect the sender MAC addresses and so track devices. Since devices like mobile phones are usually the property of a specific person that means that people can be tracked too. E.g. a shop may keep track of its customers this way, by collecting the sender MAC addresses of Wi-Fi and/or Bluetooth transmissions. Many people use a Bluetooth headset that is wirelessly connected to their phone to listen to music or to make calls. When they walk into a shop, their presence and even position can detected by the shop. Hence shops that are able to track a MAC address combined with localization use this to track user interest in various products. A Wi-Fi device that is not associated with an AP may still send Wi-Fi messages that include its MAC address, e.g. so-called probe requests. These are used by Wi-Fi devices to inquire access points (AP) in their neighborhood about their properties for connection. So Wi-Fi devices that are not connected to any AP can be tracked too.

In response to the above. there is a trend to use random MAC addresses for the sender addresses to overcome this privacy problem. A device that uses a random address changes it often, after a series of requests and answers have been completed.

In many Wi-Fi deployments, WPA2-Personal, see [WPA2], is used for the security. WPA2-Personal uses a common passphrase or preshared key (PSK) for an AP and all devices that are allowed to connect to it. WPA2-Personal is therefore also known as WPA-PSK. However, WPA3 supports a new way of using a password to connect devices securely to an AP, which is called simultaneous authentication of equals (SAE, see [WPA3] or clause 12.4 of [802.11]). Using SAE, it is possible to give every device or groups of devices their own password. When a Wi-Fi device wants to associate with an AP using SAE, and if the Wi-Fi device uses a static MAC address for itself, the AP can determine from the sender MAC address which SAE password the device will use to authenticate itself. However, there is a problem if the device uses a random MAC address. Now, the AP does not know which SAE password the device will use to authenticate itself, so the AP cannot conduct the SAE protocol successfully.

The same privacy problem is present in many other protocols. For example, when a device has been configured by the Device Provisioning Protocol (DPP), see [DPP], it has received from the DPP Configurator a Configuration Object. This Configuration Object contains a so-called Connector. The Connector is signed by the DPP Configurator. The Connector contains a public key that belongs to the device. When the device wants to connect to an AP using DPP, It sends its Connector to the AP in a so-called DPP Peer Discovery Request frame. This frame is not encrypted. Therefore the use of a Connector to connect to an AP allows tracking of the device.

SUMMARY OF THE INVENTION

It is an object of the invention to provide methods and devices for establishing a wireless secure link for alleviating at least one of the above mentioned privacy problems. For this purpose, devices and methods are provided as defined in the appended claims. According to an aspect of the invention an encryption method is provided as defined in claim 1. According to further aspects of the invention, devices are provided as defined in the independent device claims.

In the case of MAC address randomization, one would naively think that using a password ID identifying the device would be sufficient for a successful pairing protocol, but sending a password ID in the clear defeats the privacy that a random MAC address provides. While it is more difficult to track devices from location to location, because a specific password ID is only used when associating to the AP or APs of the network for which this password is valid, for a certain location this is not the case. The device can be tracked by anybody whether a specific device is associating to a specific network so is in the neighborhood of it. The inventor has realized that the problem stems from the fact that, in order for a device to connect to another device, it must identify itself. The identifying information, which is needed for establishing a secure link, can be used for tracking by third parties. The inventor has further realized that simple encryption of identifying information by a public key of the target device does not solve the problem, since the encrypted identifying information remains unique and it can be tracked. In order to have a solution to this problem it is necessary to break the one to one mapping between identifying information and the corresponding data being send in the clear. This result can be reached by using additional random information in the encryption process such that multiple encrypted sets of data correspond to the same identifying information. The receiving device would perform decryption, extract the identifying information and ignore the random information.

Further preferred embodiments of the devices and methods according to the invention are given in the appended dependent claims, disclosure of which is incorporated herein by reference.

According to a further aspect of the invention, the identifying information is an identifier for a password or passphrase and the secret is the password or passphrase, e.g. a password used for the simultaneous authentication of equals' algorithm.

According to a further aspect of the invention, the pairing protocol is based upon a Device Provisioning Protocol, the identifying information is a part of the Connector as defined in the Device Provisioning Protocol, and the first device is adapted to send a modified Connector not comprising the identifying part in unencrypted form, for enabling the second device to restore the original Connector and therefore verify the integrity of the Connector. The first device could be adapted to receive and extract the public key of the target device information from a DPP configurator.

According to a further aspect of the invention, a 802.11 4-way handshake protocol is used to derive a key on which the security of the secure channel is based and the secret is the passphrase or the PSK to use in the 4-way handshake.

BRIEF DESCRIPTION OF THE DRAWINGS

These and other aspects of the invention will be apparent from and elucidated further with reference to the embodiments described by way of example in the following description and with reference to the accompanying drawings, in which FIG. 1 shows a system in which the invention may be practiced.

The figures are purely diagrammatic and not drawn to scale. In the Figures, elements which correspond to elements already described may have the same reference numerals.

DETAILED DESCRIPTION OF EMBODIMENTS

FIG. 1 shows a system comprising a first (110), second (120) and third devices (130). Each of these devices has a communication module (111, 121, 131) comprising suitable transmitters/receivers for communication over one or more channels such as Wi-Fi, Bluetooth or wired network. Each transmitter/receiver may comprise at least one antenna (112, 122, 132) acting as input/output and a corresponding module controller (113,123, 133). Each of the devices would operate under the control of a processor (114, 124, 134). The wireless module controller and the processor may be integrated in a single system on a chip. Each of the devices may have a user interface (115, 125, 135) having at least one user control element. For example, the user control element may comprise a touch screen, various buttons, a mouse or touch pad, etc. Buttons may be traditional physical buttons, touch sensors, or virtual buttons, e.g. on a touch screen or icons to be activated via a mouse. The user interface may also be a remote user interface.

In practice the first device could correspond to a portable device such as a mobile phone, laptop or tablet having an end user. The second device could correspond to an access point such as a router. The user of the first device is interested in getting connected to the second device (the access point) for accessing one or more resources provided via the second device. The third device is not actually part of the invention, but it corresponds to a so-called eavesdropper, i.e. a device which is used by a malicious third party to obtain information about the first device or a user thereof.

In the following, specific embodiments of the invention would be described with respect to general system of the above.

In a first exemplary embodiment of the invention, the communication channel is Wi-Fi, the second device corresponds to an access point (AP), the first device attempting to connect to the AP via the SAE protocol, see [WPA3] or clause 12.4 of [802.11]. In each of the devices, the protocol according to the invention is being executed in module controller (113,123), the processor (114, 124) or by both cooperating in executing the protocol. In order to preserve its privacy, the user of the first device has set the first device to operate via MAC address randomization, for example by using the user interface of the second device. Since SAE allows for multiple passwords (which can be set by the AP administrator to be specific per device allowed to connect) and the SAE protocol is relatively complex such that completion of the protocol may require a few seconds for a tested password, it is not feasible in practice to test all passwords which were set by the AP.

To overcome this problem, it has been proposed that, the device includes a password ID in its request to associate with the AP. The so-called password ID could be known as device ID or a user ID. The purpose of this password ID is that the AP can select the right SAE password to conduct the SAE protocol with this device and therefore be able to conduct the SAE protocol successfully for the authentication of the device. Although in the certification of WPA2-Personal, only the use of a single passphrase or preshared key (PSK) for all devices is tested, nothing in the protocol prohibits the use of one single passphrase or PSK per group of devices or even per device. When device would use a random MAC address, there is also a need for a passphrase or PSK identifier in the case an AP uses separate passphrases or PSKs for certain devices. Many methods to authenticate a device for associating with an AP exist in WPA2-Enterprise, see [WPA2-E]. One of these is EAP-TLS, see [RFC 5216], where the device sends a certificate in order to be authenticated. A certificate contains individual information, which allows tracking of the device when it uses that certificate to authenticate itself.

As described above, the connecting device uses a so called Password ID, which is a unique identifier for the password to be used for the SAE protocol, However, since the Password ID could be used by the third device to track the connecting device, according to this embodiment, the privacy of the password ID is protected by having the first device encrypt the password ID of the password to use for SAE, the passphrase to use for WPA-PSK or the PSK to use for WPA-PSK and some random data (e.g. a nonce, the random MAC address or any other suitable information such as the last digits of a timestamp) using a public key of the AP. The public key to use could be configured in the wireless device together with the SAE password, passphrase or PSK, e.g. using DPP to configure the wireless device. When using DPP, the password ID itself can also be configured. The AP could also list the public key to use for encryption of the SAE password ID in any or all different transmissions in which it shows that it supports SAE, such as Beacon, DMG Beacon, Probe Response, Announce, or Information Response frames.

Encrypting the SAE password identifier directly with the public key of the AP avoids doing a Diffie-Hellman exchange e.g. as part of the setup of TLS. Since the amount of bits of the SAE password identifier is much less than that of an ECC coordinate, this can be easily encrypted using e.g. method 6.1 of [SEC1702].

While the description of the above embodiment of the inventions was with respect to the password ID, in order to improve privacy many similar things are to be treated as password ID namely MAC address, user ID, device ID, public key, because they all are suitable to be used by a malicious third party to identify a device of the user thereof.

In particular, one option would be to skip the password ID and send the MAC address itself encrypted as described above with respect to the password ID. However, it should be noted that such a solution, while prima facie less complex, it may lead to complexity with respect to backward compatibility. Since the MAC address is 40 bits and encrypting it would result in a number with many more bits, e.g. performing ECC encryption would result in two elliptic points, which points each have to be represented with at least 256 bits in case ECC curve P-256 is used, the encrypted information must be larger in size than the MAC address and therefore, modification of the messages in which the now encrypted MAC address of the wireless device are sent to the AP is needed. Note that truncated encrypted values cannot be decrypted anymore. Truncated encrypted values can only be used in comparisons to see whether the values that were encrypted are different.

In a second exemplary embodiment of the invention, the communication channel is Wi-Fi, the second device corresponds to an access point (AP), the first device corresponding to a device that has become a DPP Enrollee, because it has been configured to associate with the second device by a Device Configurator according to the DPP protocol, see [DPP]. In each of the devices, the protocol according to the invention is being executed in module controller (113,123), or in the processor (114, 124) or by both cooperating in executing the protocol. When a device has been configured by DPP, see [DPP], it has received from the DPP Configurator a Configuration Object. This Configuration Object contains a so-called Connector. The Connector is signed by the DPP Configurator. The Connector contains a public key that belongs to the device. When the device wants to connect to an AP using DPP, It sends its Connector to the AP in a so-called DPP Peer Discovery Request frame. This frame is not encrypted. Therefore the use of a Connector to connect to an AP allows tracking of the device to a similar extent as is possible when the device would use SAE with a password ID. Using the invention, instead of the first device sending its DPP Connector as it has been received during DPP Configuration, the first device encrypts its public key in its DPP Connector and replaces the in-the-clear public key in the DPP Connector with the encrypted public key and sends the so modified DPP Connector with the DPP Peer Discovery request frame to the AP. There may be other identifying information present in-the-clear in a Connector, e.g. an expiry timestamp. An expiry time stamp may not be universally unique, but only a limited set of devices will have one specific expiry timestamp in their DPP Connector. The device should treat the other identifying information in the same way as it should treat its public key in the DPP Connector according to this invention. Obviously, changing the signed DPP Connector breaks the signature, but the AP can decrypt the encrypted public key, restore the DPP Connector and successfully check the signature on the restored DPP Connector.

The devices and methods according to the various embodiments of the invention require encryption and use of random information.

According to a first solution for this aspect of the invention, public key encryption e.g. based on the RSA algorithm is used [RSA]. The identifying information is e.g. concatenated with a $2^{nd}$ string (nonce or other random information) before being encrypted. The receiving device would use its private key to decrypt the received encrypted information, then it would discard the $2^{nd}$ string to extract the identifying information As an alternative to the above encryption solution based of RSA, elliptic curve cryptography could be used, see [SEC1702]). Let a be A's private key and α=aG be his public key, where G is the generator or base point of the curve, which is publicly known. B, who wants to send an encrypted message to A, does the following:

1. B chooses a random number r, 1≤r≤n−1 and computes rG, where n is the order of G., i.e. nG equals the so called point at infinity or identity point O for which P=O+P holds for all points P on the curve.
2. B then computes M+rα. Here the message M (a binary string) has been represented as a point in ⟨G⟩
3. B sends the encrypted text pair ⟨rG,M+rα⟩ to A On receiving this encrypted text A decrypts in the following manner 1. A extracts rG and computes α·(rG)=r·(aG)=rα
2. A extracts the second part of the pair M+rα and subtracts out rα to obtain M+rα−rα=M In the above scheme, the generator G would correspond to the base point of the used curve, α=aG would correspond to the public key as used in the ECC encryption algorithm and a would correspond to the private key as it is the secret used for decryption. It should be noted that ECC already has a built-in randomization during encryption by means of the random number r. Hence other mechanisms that concatenate the identifying information and the random information are possible, as long as the receiving device is able to obtain the identifying information.

The use of ECC is more complex than that of RSA, since a block of plaintext has to be converted to a point before being encrypted, denoted by M above. After the decryption it has to be re-converted to plain text. The background of this that not all values of x, 1≤x≤n−1 are the x-coordinate of a point on the curve. [SEC1702] lists several methods for converting blocks of plaintext to elliptic points and back. Another drawback is that a message M is limited to $^2$ log n bits. However, in ECC there is no need for the device to agree how to combine the random information and the identifying information since this is predefined in the standard.

As described above, the devices and methods according to the various embodiments of the invention require public key encryption. In the following various aspects of the invention related to the distribution of the public key will be described.

In an embodiment of the invention, the AP itself may distribute its public key. The AP can list one or more public keys for use by the invention in any of Beacon, DMG Beacon, Probe Response, Announce, or Information Response frames. In particular, this could be done in the form of an extra Information Element (IE), i.e. a structure that starts with an Element ID field containing the value for indicating that the public keys(s) of the AP are listed in this IE, followed by a length field and followed by the payload. The IE may in addition contain the purpose of the one or more public keys, e.g. for encrypting an SAE password, for encrypting a preshared key (PSK), for encrypting a WPA2-Personal passphrase, or for encrypting (parts of) a DPP Connector.

In case the invention is used for encryption of the password ID, the one or more public keys may specifically be listed in the robust security network element (RSNE) in any of Beacon, DMG Beacon, Probe Response, Announce, or Information Response frames where the AP announces that it supports SAE or DPP or another method that allows an individual or group password. This listing is usually done in the robust security network element, see clause 9.4.2.25 of [802.11].

More than one public key may be used in order to support more than one public key algorithm, e.g. ECC or RSA, and/or more than one different curve for elliptic curve cryptography (ECC), see [ECC], e.g. P-256 or P-384, and/or more than one key size for RSA, see [RSA].

In addition to the public keys, the AP should also provide information including the type of cryptography, the key length or curve type used, etc. Suitable formats to list public keys may be JSON web key, see [RFC 7517] or ASN.1 SEQUENCE SubjectPublicKeyInfo from [RFC 5280].

The advantage of using a public key and not a symmetric key is that only the AP can decrypt the password identifier.

In another aspect of the invention related to key distribution, distribution of the public key of the AP is done by configuring a device. The public key(s) of the AP may also be made known to a device during configuration of that device together with the SAE password, passphrase, or PSK and their password ID or together with the DPP Connector. Many conventional ways of configuration are known, such as entering this information using a UI, presenting this information as a QR-code and reading this with a QR-code reader into a device, etc.

A convenient method to configure the public keys(s) of the AP is to use DPP, see [DPP]. A DPP Configurator configures a device by first authenticating it and after successful authentication, configuring it with a DPP Configuration Object. The Configuration Object makes it possible for the device to connect to an AP using an SAE password, passphrase, PSK or DPP Connector.

The inclusion of an SAE password, passphrase or PSK in the DPP Configuration object is already supported by DPP, see [DPP]. It is simple to extend the DPP Configuration object with the password ID and a list of AP public keys. The public keys can be added in the JSON web key format of [RFC 7517], because DPP uses that already in the DPP Configuration object. The DPP Configuration object that holds a DPP Connector can in a similar way be extended to contain a list of public keys of the AP for encryption of (parts of) the DPP Connector.

The SAE password ID may be sent preferably as part of the SAE Commit message, see [WPA3] or clause 12.4 of [802.11], but other messages during or preceding the SAE protocol can be used to. According to this invention, the encrypted SAE password ID will be sent instead of the clear text SAE password ID. Preferably, the encrypted SAE password ID is carried in an Information Element of which the Element ID signals that the Information Element carries the encrypted SAE password ID.

The way to encrypt the SAE password ID is to first select one of the public keys of the AP. If the AP has more than one public key for this purpose, somehow the public key that has been selected must be indicated in the IE that carries the encrypted SAE password ID.

In case this is an ECC public key the SAE password is then mapped to a point on the curve of the selected public key. This is preferably done by method 6.1 of [SEC1702], but many alternative methods are listed in [SEC1702] or are known elsewhere. When using the method 6.1 of [SEC1702], the bits of the characters of the SAE password are concatenated to make one large integer number. 8 or more LSB are added. This extended number is used as a potential x-coordinate. Then, the equation of the curve is used to check whether the potential x-coordinate is indeed a point on the curve. If not, the potential x-coordinate is incremented by 1 and the new potential x-coordinate is tested again for being on the curve. This is repeated until a point M on the curve has been found. This point M is then encrypted as explained in the section "ECC Encryption" above. The results of the encryption are the two points rG and M+rα. The x- and y-coordinates of these point can be stored in the Information Element as 4 large binary numbers, or as two octet strings resulting from the point to octet string of clause 12.4.7.2.4 of [802.11] for each of the two points, or the two points may be represented by compact notation, where the full x-coordinate is used and only 1 bit for the sign of the y-coordinate, etc.

In case the selected public key is an RSA key, any of the RSA encryption methods in [RFC 8017] can be used to encrypt the SAE password ID.

When using preshared key (PSK) the AP and the device that wants to associate with the AP perform a so-called 4-way handshake, see clause 12.7.6 of [802.11]. Both use the PSK and the information exchanged in the first part of the 4-way handshake to compute the key that they will base their further communication on. The PSK ID can be encrypted and stored in an Information Element in a similar manner as previously described. The resulting IE can be sent in the first message of the 4-way handshake that the device sends to the AP or in any suitable message prior to the 4-way handshake.

The DPP Connector contains the x- and y-coordinate of the device public key in-the-clear. This is an ECC key. As mentioned before, sending a DPP Connector as defined in [DPP] allows attackers to track the device to some extent. According the invention, the device first selects a public key of the AP that is an ECC public key of the same group as its own public key. The public key of the device is then encrypted directly according to the procedure previously described, since the public key is a point on the curve. The resulting two points are then stored in the connector using JSON attribute-value pairs with suitably chosen attribute names and the clear text public key JSON attribute-value pair is removed. The "encrypted" DPP Connector is then sent to the AP in a DPP Peer Discovery Request frame. The AP can see that it is an encrypted one from the JSON attribute name that it is an encrypted public key.

Removing the clear text public key and adding the two points for the encrypted public key will of course break the signature of the DPP Connector that the DPP Configurator has added to the DPP Connector when configuring the device. However, before checking the signature of the DPP Connector, the AP can first decrypt the device public key from the two points resulting from the ECC encryption, remove these two point from the received DPP Connector and insert the decrypted public key JSON attribute-value pair using the attribute names as specified in [DPP], so that the original DPP Connector is restored. The AP can then continue with the DPP protocol as specified for unencrypted public keys.

The expiry timestamp can be encrypted similarly as has been explained for the SAE password ID. The unencrypted expiry timestamp JSON attribute-value pair is removed by the device and the two points resulting from the ECC encryption are inserted in the DPP Connector using JSON attribute-value pairs with suitably chosen attribute names.

It is also possible to encrypt the entirety of a DPP Connector using ECC encryption, using the procedure in the section "ECC Encryption" above and a mapping from a large amount of octets to many ECC points, by splitting the DPP Connector into chunks that are short enough to be encrypted using the procedure in the section "ECC Encryption" above, where the same random number r is used for all of the chunks or a different r for some or each of the chunks.

The methods may be executed, for example, by circuitry and software in the processor or the Wi-Fi controller. Suitable encryption and decryption functions have been described above. Many different ways of implementing the method are possible, as will be apparent to a person skilled in the art. For example, the order of the stages or steps can be varied or some stages may be executed in parallel. Moreover, in between steps other method steps may be inserted. The inserted steps may represent refinements of the method such as described herein or may be unrelated to the method.

Computer program products, downloadable from a network and/or stored on a computer-readable medium and/or microprocessor-executable medium, are provided that comprise program code instructions for implementing the above method, connection sequence, security process and further operations when executed on a computer device. So, the method according to the invention may be executed using software, which comprises instructions for causing a processor system to perform the respective method.

Typically, devices that execute the above process, each comprise a processor coupled to a memory containing appropriate software code stored at the devices; for example, that software may have been downloaded and/or stored in a corresponding memory, e.g., a volatile memory such as RAM or a non-volatile memory such as Flash (not shown). The devices may for example be equipped with microprocessors and memories (not shown). Alternatively, the devices may, in whole or in part, be implemented in programmable logic, e.g., as field-programmable gate array (FPGA). The devices and server may be implemented, in whole or in part, as a so-called application-specific integrated circuit (ASIC), i.e. an integrated circuit (IC) customized for their particular use. For example, the circuits may be implemented in CMOS, e.g., using a hardware description language such as Verilog, VHDL etc.

Software may only include those steps taken by a particular sub-entity of the system. The software may be stored in a suitable storage medium, such as a hard disk, a floppy, a memory etc. The software may be sent as a signal along a wire, or wireless, or using a data network, e.g., the Internet. The software may be made available for download and/or for remote usage on a server. A method according to the invention may be executed using a bit stream arranged to configure programmable logic, e.g., a field-programmable gate array (FPGA), to perform the method. It will be appreciated that the software may be in the form of source code, object code, a code intermediate source and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

It will be appreciated that, for clarity, the above description describes embodiments of the invention with reference to different functional units and processors. However, it will be apparent that any suitable distribution of functionality between different functional units or processors may be used without deviating from the invention. For example, functionality illustrated to be performed by separate units, processors or controllers may be performed by the same processor or controllers. Hence, references to specific functional units are only to be seen as references to suitable means for providing the described functionality rather than indicative of a strict logical or physical structure or organization. The invention can be implemented in any suitable form including hardware, software, firmware or any combination of these.

It is noted that in this document the word 'comprising' does not exclude the presence of elements or steps other than those listed and the word 'a' or 'an' preceding an element does not exclude the presence of a plurality of such elements, that any reference signs do not limit the scope of the claims, that the invention may be implemented by means of both hardware and software, and that several 'means' or 'units' may be represented by the same item of hardware or software, and a processor may fulfill the function of one or more units, possibly in cooperation with hardware elements. Further, the invention is not limited to the embodiments, and the invention lies in each and every novel feature or combination of features described above or recited in mutually different dependent claims.

In summary, this application relates to devices and a method to establish a secure wireless link for communication between a first and a second device over a wireless physical channel, wherein a paring protocol requires sending over the wireless channel identifying information by the first device, identifying information being data suitable for identifying the device sending the identifying information or a user thereof wherein the first device encrypts and transmits the identifying information by using a public key information of the second device and random information, the second device receives the encrypted identifying information and using private key information associated with the public key information it extract the identifying information. The devices use a secret uniquely related to identifying information to derive a session key and they use the session key establish the secure wireless link. For example, the wireless channel is Wi-Fi, the identifying information is an identifier for a password or passphrase and the secret is the password or passphrase and the authentication method is simultaneous authentication of equals (SAE). Alternatively the pairing protocol is DPP and the identifying information is a part of the DPP Connector. The public key information can be transmitted in a Beacon, DMG Beacon, Probe Response, Announce, or Information Response frame.

REFERENCED DOCUMENTS

[802.11] IEEE Computer Society, "IEEE Standard for Information Technology Telecommunications and Information Exchange Between Systems Local and Metropolitan Area Networks Specific requirements Part 11: Wireless LAN Medium Access Control (MAC) and Physical Layer (PHY) Specifications," (IEEE Std. 802.11-2016), December 2016

[DH] Diffie, W.; Hellman, M. (1976), "New directions in cryptography", IEEE Transactions on Information Theory, 22 (6): 644-654

[DPP] Device Provisioning Protocol—Technical Specification—Version 1.0, Wi-Fi Alliance, 2018.

[ECC] Koblitz, N. (1987). "Elliptic curve cryptosystems". Mathematics of Computation. 48 (177): 203-209.

[RFC 5216] "The EAP-TLS Authentication Protocol", March 2008, https://datatracker.ietf.org/doc/rfc5216/

[RFC 5280] Internet X.509 Public Key Infrastructure Certificate and Certificate Revocation List (CRL) Profile, May 2008, https://datatrackerletforg/doc/rfc5280/

[RFC 7517] JSON Web Key (JWK), May 2015, https://datatrackerletforg/doc/rfc7517/

[RFC 8017] PKCS #1: RSA Cryptography Specifications Version 2.2, November 2016, https://datatracker.ietf.org/doc/rfc8017/[RSA]

[RSA] Rivest, R.; Shamir, A.; Adleman, L. (February 1978). "A Method for Obtaining Digital Signatures and Public-Key Cryptosystems", Communications of the ACM. 21 (2): 120-126.

[SEC1702] Aritro Sengupta and Utpal Kumar Ray, "Message mapping and reverse mapping in elliptic curve cryptosystem", Security Comm. Networks 2016; 9:5363-5375, Published online 22 Nov. 2016 in Wiley Online Library (wileyonlinelibrary.com). DOI: 10.1002/sec.1702.

[WPA2-E] WPA2™-Enterprise Provides Security-Protected Authentication and Enables Product Use in Multiple Markets, Wi-Fi Alliance Security Marketing TG, 30 Apr. 2008, https://groups.wi-fi.org/apps/org/workgroup/gmdocs/download.php/10413/20080430%20WPA2-Enterprise%20Technical%20Note%20for%20WFA%20Members.pdf

[WPA2] Wi-Fi Protected Access (WPA), Enhanced Security Implementation Based on IEEE P802.11i standard, Version 3.1, August, 2004, Wi-Fi Alliance.

[WPA3] WPA3™ Specification, Version 1.0, April 2018, Wi-Fi Alliance.

The invention claimed is:

1. A method for establishing a secure wireless link for communication between a first device and a second device over a wireless physical channel,
   wherein a paring protocol requires the first device send identifying information over the wireless physical channel, the identifying information identifying the device sending the identifying information or a user thereof,
   wherein the pairing protocol is based upon a Device Provisioning Protocol and wherein the identifying information is a part of the Connector as defined in the Device Provisioning Protocol;
   the method comprising:
      generating random information;
      encrypting, by the first device, a combination of the identifying information and the random information by using a public key information of the second device to provide encrypted identifying information;
      transmitting, by the first device, the encrypted identifying information over the wireless physical channel;
      receiving, by the second device, the encrypted identifying information and using private key information associated with the public key information to extract the identifying information;
      using a secret uniquely related to the identifying information to derive a session key,
         wherein a simultaneous authentication of equals' algorithm is used for deriving the session key and the secret is a password used for the simultaneous authentication of equals' algorithm,
      using the session key to establish the secure wireless link, and
      using the encrypted identifying information to restore the Connector and to verify the integrity of the Connector.

2. A device being a first device adapted to establish a secure wireless link for communication between the first device and a second device over a wireless physical channel,
   wherein a Device Provisioning Protocol requires the first device send identifying information over the wireless physical channel,
   wherein the identifying information is a part of a Connector as defined in the Device Provisioning Protocol,
   wherein the identifying information uniquely determines the device sending the identifying information or a user thereof;
   the device comprising:
      a processor, wherein the processor is arranged to:
         generate random information;
         encrypt a combination of the identifying information and the random information by using a public key information of the second device to provide a modified Connector;
         derive a session key using a secret that is uniquely related to the identifying information,
            wherein a simultaneous authentication of equals' algorithm is used for deriving the session key and the secret is a password used for the simultaneous authentication of equals' algorithm; and
         use the session key to establish the secure wireless link with the second device; and
      a transmitter that is arranged to transmit the modified Connector over the wireless channel; and
   wherein the modified Connector enables the second device to restore the original Connector and thereby verify the integrity of the Connector.

3. The device according to claim 2, wherein the identifying information is an identifier for a password or passphrase and the secret is the password or passphrase.

4. The device according to claim 2, wherein the device is adapted to receive and extract the public key information from a Beacon, DMG Beacon, Probe Response, Announce, or Information Response frame.

5. The device according to claim 2, wherein the device is adapted to receive and extract the public key information from a DPP configurator.

6. The device according to claim 2, wherein the 802.11 4-way handshake protocol is used to derive a key on which the security of the secure channel is based and the secret is the passphrase or the PSK to use in the 802.11 4-way handshake protocol.

7. A device being a second device adapted to establish a secure wireless link for communication between a first device and the second device over a wireless physical channel,
   wherein a paring protocol requires the first device send identifying information over the wireless physical channel,
   wherein the identifying information identifies the device sending the identifying information or a user thereof,
   wherein the pairing protocol is based upon a Device Provisioning Protocol and
   wherein the identifying information is a part of a Connector as defined in the Device Provisioning Protocol;
   wherein the device has a public key information and a secret key information associated therewith,
   the device comprising:
      a receiver adapted to receive, over the wireless channel, encrypted identifying information, wherein the encrypted identifying information comprises identifying information and random information encrypted by the public key information;
a processor adapted to:
use the private key information to decrypt the encrypted identifying information;
extract the identifying information;
use a secret uniquely related to the identifying information to derive a session key,
wherein a simultaneous authentication of equals' algorithm is used for deriving the session key and the secret is a password used for the simultaneous authentication of equals' algorithm; and
use the session key to establish the secure channel,
wherein the device is adapted to use the encrypted identifying information to restore the Connector and to verify the integrity of the Connector.

8. The device according to claim 7, wherein the identifying information is an identifier for a password or passphrase and the secret is the password or passphrase.

9. The device according to claim 8, wherein the device is adapted to receive and extract the public key information from a Beacon, DMG Beacon, Probe Response, Announce, or Information Response frame.

10. A device according to claim 8, wherein the device is adapted to receive and extract the public key information from a DPP configurator.

11. A device according to claim 8, wherein a 802.11 4-way handshake protocol is used to derive a key on which the security of the secure channel is based and the identifying information indicates the passphrase or PSK to use in the 802.11 4-way handshake protocol.

12. A method for a first device to establish a secure wireless link for communication between the first device and a second device over a wireless physical channel,
wherein a paring protocol requires the first device send identifying information over the wireless physical channel,
wherein the identifying information identifies the device sending the identifying information or a user thereof,
wherein the pairing protocol is based upon a Device Provisioning Protocol, and wherein the identifying information is a part of the Connector as defined in the Device Provisioning Protocol;
the method comprising:
generating random information;
encrypting a combination of the identifying information and the random information by using a public key information of the second device;
transmitting the encrypted identifying information over the wireless physical channel;
receiving, by the second device, the encrypted identifying information and using private key information associated with the public key information to extract the identifying information;
using a secret uniquely related to identifying information to derive a session key,
wherein a simultaneous authentication of equals' algorithm is used for deriving the session key and the secret is a password used for the simultaneous authentication of equals' algorithm;
using the session key to establish the secure wireless link, and
using the encrypted identifying information to restore the Connector and to verify the integrity of the Connector.

13. A method for a second device to establish a secure wireless link for communication between the second device and a first device over a wireless physical channel,
wherein a paring protocol requires the first device send identifying information over the wireless physical channel,
wherein the identifying information identifies the device sending the identifying information or a user thereof,
wherein the pairing protocol is based upon a Device Provisioning Protocol and wherein the identifying information is a part of the Connector as defined in the Device Provisioning Protocol;
wherein the first device generates random information and encrypts a combination of the identifying information and the random information by using a public key information of the second device to produce encrypted identifying information and transmits the encrypted identifying information over the wireless channel;
the method comprising:
receiving the encrypted identifying information and using private key information associated with the public key information to extract the identifying information;
using a secret uniquely related to identifying information to derive a session key,
wherein a simultaneous authentication of equals' algorithm is used for deriving the session key and the secret is a password used for the simultaneous authentication of equals' algorithm,
using the session key to establish the secure wireless link,
using the encrypted identifying information to restore the Connector and to verify the integrity of the Connector.

14. The method according to claim 12, wherein the identifying information is an identifier for a password or passphrase and the secret is the password or passphrase.

15. The method according to claim 14, wherein the first device is adapted to receive and extract the public key information from a Beacon, DMG Beacon, Probe Response, Announce, or Information Response frame.

16. The method according to claim 14, wherein the first device is adapted to receive and extract the public key information from a DPP configurator.

17. The method according to claim 14, wherein the 802.11 4-way handshake protocol is used to derive a key on which the security of the secure channel is based and the secret is the passphrase or the PSK to use in the 802.11 4-way handshake protocol.

* * * * *